United States Patent [19]

Bartel et al.

[11] 4,441,667

[45] Apr. 10, 1984

[54] CASSETTE FOR WINDING BAND-LIKE PHOTOGRAPHIC MATERIAL

[75] Inventors: Siegfried Bartel, Gauting; Wolfgang Ermer; Bernd Payrhammer, both of Munich, all of Fed. Rep. of Germany

[73] Assignee: AGFA-Gevaert AG, Leverkusen, Fed. Rep. of Germany

[21] Appl. No.: 329,564

[22] Filed: Dec. 10, 1981

[30] Foreign Application Priority Data

Dec. 23, 1980 [DE] Fed. Rep. of Germany ....... 3048727

[51] Int. Cl.³ .................. G03B 1/04; G03B 23/02; G11B 15/04
[52] U.S. Cl. ..................................... 242/197; 352/72
[58] Field of Search .............. 242/71, 71.1, 197, 200, 242/192; 352/72–78 R

[56] References Cited

U.S. PATENT DOCUMENTS

| | | | |
|---|---|---|---|
| 1,317,404 | 9/1919 | Thomas | 242/192 |
| 1,942,890 | 1/1934 | Wittel | 242/192 |
| 1,994,586 | 3/1935 | Mihalyi | 352/72 |
| 2,205,052 | 6/1940 | Stein | 242/71.7 |
| 3,691,921 | 9/1972 | Isbell | 242/197 X |
| 4,166,588 | 9/1979 | Krehbiel et al. | 242/67.1 R |

Primary Examiner—Leonard D. Christian

[57] ABSTRACT

A cassette for winding a band-like photographic material has housing with a slot for introducing the material, a driven winding core having an endless band tensioned by a plurality of rollers and arranged to place the front of the material onto the winding core, and two lever arms pivotable about pivot axes which are parallel to the winding core axis, carrying at their ends guiding rollers and coupled with one another via the endless band, wherein one of the lever arms is connected with a spring element so that the lever arms in an initial condition assume a first position in which said endless band widely embraces the winding spool, and during further winding upon overcoming a dead point of the spring element the lever arms assume a second position in which the endless band is brought out of the region of a greatest possible spool.

10 Claims, 1 Drawing Figure

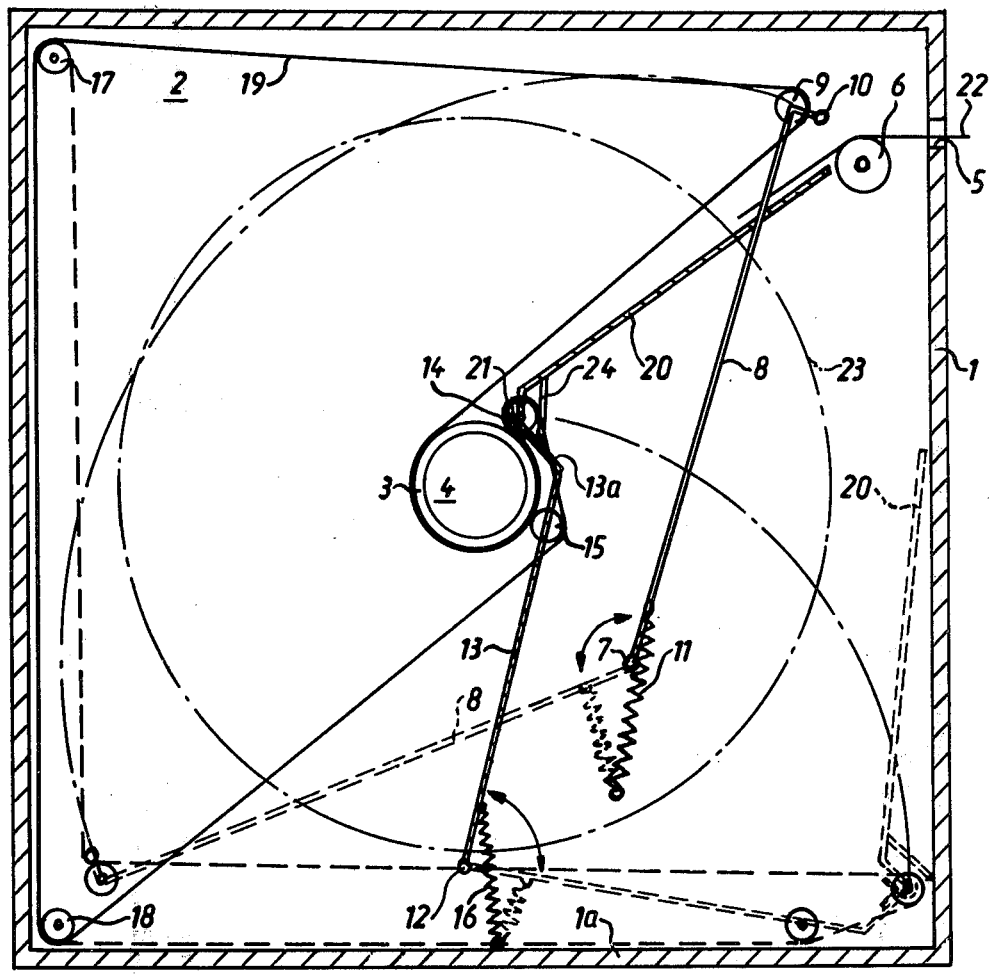

CASSETTE FOR WINDING BAND-LIKE PHOTOGRAPHIC MATERIAL

BACKGROUND OF THE INVENTION

The present invention relates to a cassette for winding a band-like photographic material.

Cassettes of the above-mentioned general type are known in the art. A known cassette for winding a band-like photographic material has a housing with a slot for introducing of the material, a driven winding core, and an endless band tightened by a plurality of guiding rollers and arranged to thread up or place the initial end of the photographic material onto the winding core. One of such cassettes is disclosed, for example, in the German Auslegeschrift, No. 2,804,137. The endless band in this cassette is guided about a guiding roller arranged on a pivotally supported lever arm, the guiding roller moving during the increase of the spool dimension, outwardly against the force of a leaf spring. The disadvantage of this arrangement is that the endless band during the entire winding process abuts against the photographic material, which can lead especially in the event of the photographic reel paper to pressure exposure.

SUMMARY OF THE INVENTION

Accordingly, it is an object of the present invention to provide a cassette for winding a band-like photographic material which avoids the disadvantages of the prior art.

More particularly, it is an object of the present invention to provide a cassette for winding a band-like photographic material in which after the threading up or intercepting step, the endless band displaces away from the spool.

In keeping with these objects and with others which will become apparent hereinafter, one feature of the present invention resides, briefly stated, in a cassette provided with two lever arms pivotable about pivot axes which are parallel to an axis of a winding core, carrying at their ends guiding rollers and coupled with one another via an endless band, wherein one of the lever arms is connected with a spring element so that the lever arms in an initial condition assume a first position in which the endless band widely embraces the winding spool, and during further winding upon overcoming a dead point of the spring element the lever arms assume a second position in which the endless band is brought out of the region of a greatest possible spool.

When the cassette is designed in accordance with the present invention, after first spool coils the lever system shifts and the endless band wound on the outer walls of the cassette so that the material can be wound without pressure by the band.

Still another advantage of the present invention is that the invention cassette can be utilized both as a winding-on cassette and a winding off cassette; in other words, the complete spool can be inserted into the cassette for the purposes of winding off, whereupon the winding region is free from band or guiding elements. The winding off is also facilitated inasmuch as the band does not abut against the spool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view showing a cross-section of the cassette for winding a band-like photographic material, in accordance with the present invention.

DESCRIPTION OF A PREFERRED EMBODIMENT

A cassette for winding a photographic material has a cassette housing identified by reference numeral 1 and having a closed lateral wall 2. Opposite to the lateral wall 2, a cassette wall to be opened is provided. This openable cassette wall is not shown in the drawing and is arranged so that in open condition of the cassette, a spool core 3 can be fitted onto a winding core 4 by movement in an axial direction. The winding core 4 is connected with a drive which leads from one side into the cassette. An inlet slot 5 is provided on a small side of the cassette. A turning or deviating roller 6 is arranged behind the slot 5 inside the cassette housing 1.

A pivot axis 7 is arranged parallel to the axis of the winding core 4 and located on a line between the axis of the winding core and a lower housing corner of the cassette smaller side which is provided with the inlet slot 5. The distance of the pivot axis 7 from the axis of the winding core 4 and the lower cassette corner is selected in accordance with the relationship approximately 1:2. A lever arm 8 is supported on the pivot axis 7 and extends with its one end approximately to the turning roller 6 in one end position. A first guiding roller 9 and a second guiding roller 10 are rotatably arranged on the end of the lever 8.

A strong pulling string 11 is suspended in the vicinity of the pivot axis 7 on the lever arm 8. The other end of the pulling string 11 is fixedly connected with the housing. The pulling string 11 extends substantially in the direction of elongation of the lever arm 8 outwardly beyond the pivot axis 7 and forms an angle of several grades, for example 5°, with the plane of the lever arm 8. Thereby it is attained that during movement of the lever arm 8 in counterclockwise direction over the above-mentioned angle, the dead point of the spring 11 is passed and the lever arm 8 is brought in the position shown by dashed lines because of the force of the spring 11.

A second pivot axis 12 extends parallel to the pivot axis 7 and is located approximately on the vertical line extending through the axis of the winding core 4 closely above a bottom 1a of the cassette. A second lever arm 13 is mounted on the second pivot axis 12 and has an angled end portion 13a provided with a first guiding roller 14 and a second guiding roller 15 located close to the bend. The second lever arm 13 is connected with a pulling spring 16 extending from the bottom 1a of the cassette. The pulling spring 13 is suspended in certain distance from the pivot axis 12 on the lever arm 13. The pulling string 16 has a considerably lower force than the pulling spring 11.

Finally, turning rollers 17 and 18 are arranged at a cassette small side which is opposite to the small side provided with the inlet slot. The turning rollers 17 and 18 are provided in the upper and lower corners of the housing and have axes which are parallel to the axis of the winding core 4.

An endless band 19 runs outwardly about the turning rollers 18 and 17, between the guiding rollers 9 and 10 on the end portion of the lever arm 8 between these guiding rollers, about the spool core 3, about the guiding roller 14 of the angled end portion 13a, and on the rear side of the guiding roller 15 of the lever arm 13, and then back to the lower turning roller 18. Furthermore, a guiding flap 20 is pivotably connected with the axis of the turning roller 14 on the angled lever arm 13a. The guiding flap leads with its end to the turning roller 6 behind the inlet slot 5. A leg spring 21 holds the flap 20 which abuts with its abutment portion 24 against the angled end portion 13a of the lever arm 13. This position is shown in solid lines.

During the operation, a material band 22 is introduced into the cassette housing 1 through the inlet slot 5 and is guided through a passage formed between the endless band 19 and the guiding flap 20 to the winding core 4. The front of initial portion of the band is finally inserted into the loop of the endless band 19 about the spool core 3 and is retained in the first winding position by the endless band 19 which embraces the spool core 3 over approximately 270°. This retention is performed until the subsequent rotation of the winding core 4 acts for engagement and holding of the band. With the increase of the spool dimension, the radius of embracement of the endless band 19 also increases, the lever arm 13 slightly pivots in clockwise direction and the lever arm 8 because of the constant endless band length, pivots in counterclockwise direction. As soon as the lever arm 8 passes the dead point of pulling spring 11, it assumes as mentioned above, the position shown in the dashed lines. The lever arm 13 is so free from the endless band 19 that it falls into the position shown in dashed lines because of the force of the spring 16 or its own weight. For the movement of the lever arm 13, the guiding flap 20 comes to abutment against the inner wall of the cassette and pivots in counterclockwise direction and against the force of the leg spring 21. With this pivoting the lever arms 8 and 13 bring also the endless band out of the region of a greatest possible spool 23.

The full spool can be easily removed from the cassette. Moreover, a full spool can be inserted into the cassette in this manner and the cassette can be utilized as a winding-off cassette. Because of the swingable off band, the winding off of the material band 22 from the spool 23 is facilitated.

The dead point of the spring 11 can be adjusted so finely that the pivoting off of the lever arms 8 and 13 is attained after only several coils, so that for the main part of the spool 23, the pressure exposure from the endless band 19 or the guiding rollers 14 and 15 can be avoided.

In order to make the cassette ready for the operation, it is necessary to arrange the lever arm 8 in the position shown in solid lines. This can be carried out by hand or by a not-shown device which in the event of fitting of the cassette onto a handling tool passes the lever in the initial position. At the movement of the lever arm 8 into the initial position, the endless band 18 is so tightened that the lever arm 13 is also lifted to the initial position.

It will be understood that each of the elements described above, or two or more together, may also find a useful application in other types of constructions differing from the types described above.

While the invention has been illustrated and described as embodied in a cassette for winding a band-like photographic material it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cassette for winding a band-like photographic material to form a spool, comprising a housing having a slot for introducing a material; a driven winding core having an axis; an endless band; a spring element; two lever arms pivotable about pivot axes which are parallel to said winding axis, carrying at their ends guiding rollers and coupled with one another via said endless band, one of said lever arms being connected with said spring element so that said lever arms in an initial condition assume a first position in which said endless band widely embraces said winding spool, and during further winding upon overcoming a dead point of said spring element said lever arms assume a second position in which said endless band is brought out of the region of a greatest possible spool.

2. A cassette as defined in claim 1, wherein said one spring element with which said one lever arm is connected extends in a plane which forms an angle of several degrees with a plane of said one lever arm in said first position.

3. A cassette as defined in claim 2, wherein said angle between the plane of said one spring and said plane of said one lever arm is equal to 5°.

4. A cassette as defined in claim 1; and further comprising a spool core mountable on said winding core, the other of said lever arms is arranged so that it abuts with its guiding rollers against said spool core under the action of tensioning of said endless band as long as said one lever arm is in said first position, and upon assuming said second position by said one lever arm it turns outwardly.

5. A cassette as defined in claim 4, wherein said other lever arm is arranged to turn outwardly because of its own weight and relieving of said endless band.

6. A cassette as defined in claim 1; and further comprising a further spring associated with said other lever arm.

7. A cassette as defined in claim 1, wherein said housing has a first small side provided with said slot and a second small side opposite to said first small side; and further comprising two turning rollers for said endless band, fixedly arranged adjacent said second small side of said housing.

8. A cassette as defined in claim 7; and further comprising a spool core mountable of said winding core, said endless band in said first position embraces said lever arms, said turning rollers, one of said guiding rollers of said one lever arm, said spool core over an angle of 270° and said guiding rollers of the other of said lever arms.

9. A cassette as defined in claim 1; and further comprising a guiding flap pivotably connected with an axis of one of said guiding rollers of the other of said lever arms, a further turning roller arranged in the region of said slot so that said guiding flap leads said further turning roller, and a spool core mountable on said winding core so that a passage is formed between said guiding flap and said endless band from said slot to said spool core.

10. A cassette as defined in claim 9, wherein said guiding flap has a leg spring and an abutment arranged to hold said guiding flap in a guiding position, said guiding flap being pivotable with turning of said other lever arm.

* * * * *